United States Patent
Lubowich et al.

(10) Patent No.: US 8,311,824 B2
(45) Date of Patent: Nov. 13, 2012

(54) METHODS AND APPARATUS FOR LANGUAGE IDENTIFICATION

(75) Inventors: Yuval Lubowich, Raanana (IL); Moshe Wasserblat, Maccabim (IL); Dimitri Volsky, Tel-Aviv (IL); Oren Pereg, Amikam (IL)

(73) Assignee: Nice-Systems Ltd, Raanana, IL (US)

( * ) Notice: Subject to any disclaimer, the term of this patent is extended or adjusted under 35 U.S.C. 154(b) by 1052 days.

(21) Appl. No.: 12/258,463

(22) Filed: Oct. 27, 2008

(65) Prior Publication Data

US 2010/0106499 A1    Apr. 29, 2010

(51) Int. Cl.
*G10L 15/26*    (2006.01)
(52) U.S. Cl. ........ 704/235; 704/243; 704/254; 704/277; 704/270; 704/9; 434/157; 434/156; 705/14.64
(58) Field of Classification Search .................. 704/235, 704/243, 260, 254, 277, 9, 4, 251, 255, 270, 704/2, 231, 265; 434/157, 156; 705/14.64; 348/461; 715/264; 707/739
See application file for complete search history.

(56) References Cited

U.S. PATENT DOCUMENTS

| | | | | |
|---|---|---|---|---|
| 5,805,771 | A * | 9/1998 | Muthusamy et al. | 704/232 |
| 6,985,863 | B2 * | 1/2006 | Itoh et al. | 704/257 |
| 7,702,039 | B2 * | 4/2010 | Gieske et al. | 375/324 |
| 7,876,856 | B2 * | 1/2011 | Elahi et al. | 375/316 |
| 8,108,212 | B2 * | 1/2012 | Maegawa | 704/235 |
| 2004/0078191 | A1 * | 4/2004 | Tian et al. | 704/9 |
| 2008/0126093 | A1 * | 5/2008 | Sivadas | 704/254 |
| 2008/0228480 | A1 * | 9/2008 | Maegawa | 704/235 |
| 2008/0235027 | A1 * | 9/2008 | Cross | 704/270.1 |
| 2009/0070102 | A1 * | 3/2009 | Maegawa | 704/9 |
| 2009/0271195 | A1 * | 10/2009 | Kitade et al. | 704/239 |
| 2012/0059810 | A1 * | 3/2012 | Sejnoha et al. | 707/706 |

* cited by examiner

*Primary Examiner* — Vijay B Chawan
(74) *Attorney, Agent, or Firm* — Soroker-Agmon Advocates and patent Attorneys (57) ABSTRACT

In a multi-lingual environment, a method and apparatus for determining a language spoken in a speech utterance. The method and apparatus test acoustic feature vectors extracted from the utterances against acoustic models associated with one or more of the languages. Speech to text is then performed for the language indicated by the acoustic testing, followed by textual verification of the resulting text. During verification, the resulting text is processed by language specific NLP and verified against textual models associated with the language. The system is self-learning, i.e., once a language is verified or rejected, the relevant feature vectors are used for enhancing one or more acoustic models associated with one or more languages, so that acoustic determination may improve.

19 Claims, 5 Drawing Sheets

METHODS AND APPARATUS FOR LANGUAGE IDENTIFICATION

TECHNICAL FIELD

The present disclosure relates to audio analysis in general and to identifying the language, dialect or accent spoken in an audio stream or file, in particular.

BACKGROUND

Many organizations or organizations' units that mainly handle interactions, such as call centers, customer relations centers, trade floors, law enforcements agencies, homeland security offices or the like, receive interactions in multiple languages. For example, a call center may provide services to customers speaking English, French or Spanish. In some cases the language in which the customer speaks is known, for example from an Interactive Voice Response (IVR) system, or according to the called number. In other cases, however, the language is not a-priori known. Knowing the language used by a customer, a supplier, or another person such as an employee or a person providing outsourcing services to an organization (for example a freelance delivery person working with a delivery company) may enable to transfer the call to a person who speaks the language. Alternatively, the call or a recording thereof may be transferred to an appropriate automated system for handling or for analysis the calls. For example, in order to categorize calls into categories characterized by keywords, it is important to identify the language spoken in the call, otherwise the extracted words may be altogether wrong, and so is the categorization of the call, or further processing of calls in the category.

Known techniques for language identification include acoustic language identification, i.e., matching speech samples against one or more acoustic models of the environment in order to identify the spoken language. However, acoustic language identification has relatively high error rate, which can even get to 60%. Generally, the more languages the system has to identify, the higher the error rate. When the error rate is high, for example around 60% and there are only two languages, it may be better to choose arbitrarily the language rather than to activate the automatic language identification system. Acoustic language identification improves as the acoustic model is constructed upon larger corpus, but constructing such a corpus, for which the language is known, is labor intensive.

Another known group of techniques relates to textual language verification, i.e., verifying whether an audio segment is in a particular language, once the text of the audio is provided. When activating a speech to text (S2T) engine of the wrong language, for example when trying to perform English speech to text on audio in which Spanish is spoken, the results are usually poor, and the resulting text is easily identified as meaningless and having high probability that it does not result from English utterance. However S2T engines and textual verification consume significant processing resources, including CPU, memory and time, and are thus non applicable to environments in which the spoken language is a-priori unknown and multiple tests may be required.

There is thus a need in the art for a method and apparatus for language identification, in order to improve and accelerate processes in a call center, such as directing a call, categorizing an interaction or further processing of an interaction. The method and apparatus should provide low error rate, and low requirement for manual labor or processing resources.

SUMMARY

A method and apparatus for language identification of spoken text, using acoustical language identification to identify an estimated language, followed by speech to text with the estimated language and verification whether the text is indeed in the estimated language.

In accordance with a first aspect of the disclosure, there is thus provided a method for determining a language spoken in an audio segment, from a multiplicity of languages, the method comprising the steps of: receiving the audio segment; performing acoustical language identification to yield an at least one estimated language spoken in the audio segment; performing speech to text on the audio segment to yield estimated text, using a speech to text engine of a selected language of the at least one estimated languages; extracting a linguistic feature or statistical data from the estimated text; verifying whether the estimated text is in the selected language; if the estimated text is in the selected language, outputting the selected language as the language spoken in the audio segment; if the estimated text is not in the selected language, selecting another language from the at least one estimated languages and repeating the for a second language the steps of speech-to-text, extracting linguistic feature or statistical data, verifying the language and outputting if the segment is in the second language; If there are no more estimated languages, outputting that the language of the audio segment is not one of the multiplicity of languages. The method can further comprise an acoustic model generation or enhancement step for generating or enhancing one or more acoustic models associated with each of the multiplicity of languages, for performing the acoustical language identification. The method can further comprise a textual model generation or enhancement step for generating or enhancing the textual model associated with each of the multiplicity of languages. Within the method, the acoustical language identification optionally comprises the steps of: extracting one or more acoustic feature vectors from the audio segment; scoring the acoustic feature vectors against an acoustic model constructed upon audio data spoken in a particular language, to yield a first score; scoring the acoustic feature vectors against an acoustic model constructed upon audio data spoken in languages other than the particular language, to yield a second score; and comparing the first score and the second score: if the first score exceeds the second score, or if the first score exceeds the second score by at least a predetermined threshold or percentage, indicating the particular language as the selected language. The method can further comprise repeating the scoring and comparing steps for a second particular language. Within the method, verifying whether the estimated text is in the selected language optionally comprises the steps of: scoring the estimated text against a textual model constructed upon text in the selected language, to yield a first score; if the first score exceeds a predetermined threshold, indicating that the audio segment is in the particular language. The method can further comprise repeating the steps of scoring and indicating for a second particular language. Within the method, the acoustical language identification optionally comprises the steps of: extracting one or more acoustic feature vectors from the audio segment; scoring the acoustic feature vectors against a first acoustic model constructed upon audio data spoken ill a particular language, to yield a first score; scoring the acoustic feature vectors against a second acoustic model constructed upon audio data spoken in languages other than the particular language, to yield a second score; and if the first score exceeds the second score, or if the first score exceeds the second score by at least a predetermined threshold or percentage, indicating the particular language as the selected language; and wherein verifying whether the estimated text is in the selected language comprises the steps of scoring the estimated text against a textual model constructed upon text in a particular language, to yield a first score; scoring the estimated text against a textual model constructed upon text not in the particular language, to yield a second score; and if the first score exceeds the second score, or if the first score exceeds the second score by at least a predetermined threshold or percentage, indicating that the audio segment is in the particular language; and further comprising the steps of enhancing the first acoustic model with the feature vector if the audio segment is in the particular language; and enhancing the second acoustic model with the feature vector if the audio segment is not in the particular language. The method can further comprise the steps of: tracking cases in which the estimated text is not in the selected language; and if the frequency of the cases drops below a predetermined threshold, omitting for further audio segments the steps of extracting the linguistic feature or statistical data from the estimated text, verifying whether the estimated text is in the selected language according to the linguistic feature or statistical data, if the estimated text is in the selected language, outputting the selected language as the language spoken in the audio segment if the estimated text is not in the selected language, selecting another language from the at least one estimated languages and repeating the steps of extraction, verification and outputting for the other language; and if there are no more estimated languages, outputting that the language of the audio segment is not one of the multiplicity of languages. The method can further comprise a step of directing a call or an interaction to a particular person or system based on the language spoken in the call or interaction.

Another aspect of the disclosure relates to an apparatus for determining a language spoken in an audio segment, from a multiplicity of languages, the apparatus comprising: a feature extraction component for extracting at least one feature vector from the audio segment; an acoustic scoring component for scoring the feature vector against one or more acoustic models associated with one or more languages selected from the multiplicity of languages; a speech to text engine for each of the multiplicity of languages; and a textual scoring component for verifying using a textual model associated with the selected languages, whether the text produced by the speech to text engine is indeed in the selected language. The apparatus can further comprise an acoustic model construction or enhancement component for generating or enhancing one or more acoustic models associated with each of the multiplicity of languages. The apparatus can further comprise a textual model construction or enhancement component for generating or enhancing textual models associated with each of the multiplicity of languages. Within the apparatus, an acoustic model associated with each of the multiplicity of languages optionally comprises an acoustic language model and an acoustic non-language model. Within the apparatus a textual model associated with any of the multiplicity of languages optionally comprises a textual language model and a textual non-language model.

Yet another aspect of the disclosure relates to an apparatus for determining a language spoken in an audio segment capturing one or more interactions, from a multiplicity of languages, the apparatus comprising: an interaction receiving or capturing component for receiving or capturing the audio segment; a storage component for storing the audio segment, one or more acoustic language models and one or more textual language models; an acoustic feature extraction component for extracting one or more acoustic feature vectors from the audio segment; an acoustic scoring component for scoring the feature vector against one or more acoustic models associated with a selected language; a speech to text engine for each of the multiplicity of languages; a textual feature extraction component for extracting at least one textual feature vector from text generated by the speech to text engine; and a textual scoring component for verifying using a textual model associated with the selected language, whether the text produced by the speech to text engine is indeed in the selected language. The apparatus can further comprise a natural language processing component for processing text. The apparatus can further comprise a redirection component for directing the at least one interaction to a particular person or system, or for calling back a person who made the at least one interaction. The apparatus can further comprise a filtering component for filtering the at least one interaction according to an at least one parameter; a voice analysis component for analyzing the at least one interaction; and a categorization component for categorizing the at least one interaction into an at least one category.

Yet another aspect of the disclosure relates to a computer readable storage medium containing a set of instructions for a general purpose computer, the set of instructions comprising: receiving an audio segment in which one language out of a multiplicity of languages is spoken; performing acoustical language identification to yield an at least one estimated language spoken in the audio segment; performing speech to text on the audio segment to yield estimated text, using a speech to text engine of a selected language of the at least one estimated languages; verifying whether the estimated text is in the selected language; if the estimated text is in the selected language, outputting the selected language as the language spoken in the audio segment; if the estimated text is not in the selected language, selecting a second language from the at least one estimated languages and repeating the speech to text, verification and outputting steps with the second language; and if there are no more estimated languages, outputting that the language of the audio segment is not one of the multiplicity of languages.

BRIEF DESCRIPTION OF THE DRAWINGS

The present invention will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter provides a method and apparatus for adaptive language identification. The disclosed method and apparatus employ a training phase and a testing (also referred to as runtime) phase. However, results collected s during the testing phase can be fed back and used to improve the trained model, and thus further enhance performance in further tests.

During the training stage, for each language, such as English, Spanish or the like, generally referred to as language X, two acoustic models are created, an X language model, and a non-X language model. The acoustic models are optionally generated based on an amount of audio data in language X, the amount being small relatively to the amount of data required for a full acoustic model, and similarly a small amount of audio data in other languages. In the training phase, the language of each audio segment is known.

On the testing phase, for each segment or utterance, it is determined using the acoustic models generated during the training stage what is the score or probability that the segment or utterance is in a specific language. The scoring is optionally done for all supported languages. Alternatively, if scoring for a particular language provides a value higher than a predetermined threshold, no further languages are checked. Further optionally, the optional languages are checked in the order of their expected frequency, i.e., the more common languages are scored prior to less frequent ones.

Using the particular language determined by the acoustic score, a speech to text (S2T) engine of the particular language is operated. Then, text-dependent language verification is performed using the text resulting from the S2T engine. The accuracy of text-dependent language verification engines is high. Therefore, if the language is verified to be the language identified by the acoustic, it is assumed that the audio segment is indeed of the particular language. Optionally, in these cases, the acoustic model of the particular language is enhanced with characteristics or features from the segment. On the other hand, if the text-dependent language verification engine indicates that the segment is not in the language indicated by the acoustic score, the audio segment is assumed to be not of the particular language, and the acoustic non-language model is enhanced with characteristics or features from the segment.

Thus, the acoustic language and non-language models are preferably enhanced in run time. Optionally, the cases wherein the text-dependent speech verification indicated that the segment is not in the language identified by the acoustic score are tracked. When the frequency of these cases drops below a predetermined threshold, transcribing the segment and activating the text-dependent speech verification can be omitted, and it is assumed that the language and non-language models are representative of the environment. This makes the process even more efficient, without harming its accuracy.

It will be appreciated that the disclosed method and apparatus may relate not only to languages, but also to dialects or to different accents, so that audio signals can be handled or directed to the most appropriate person or system.

Figure 1:
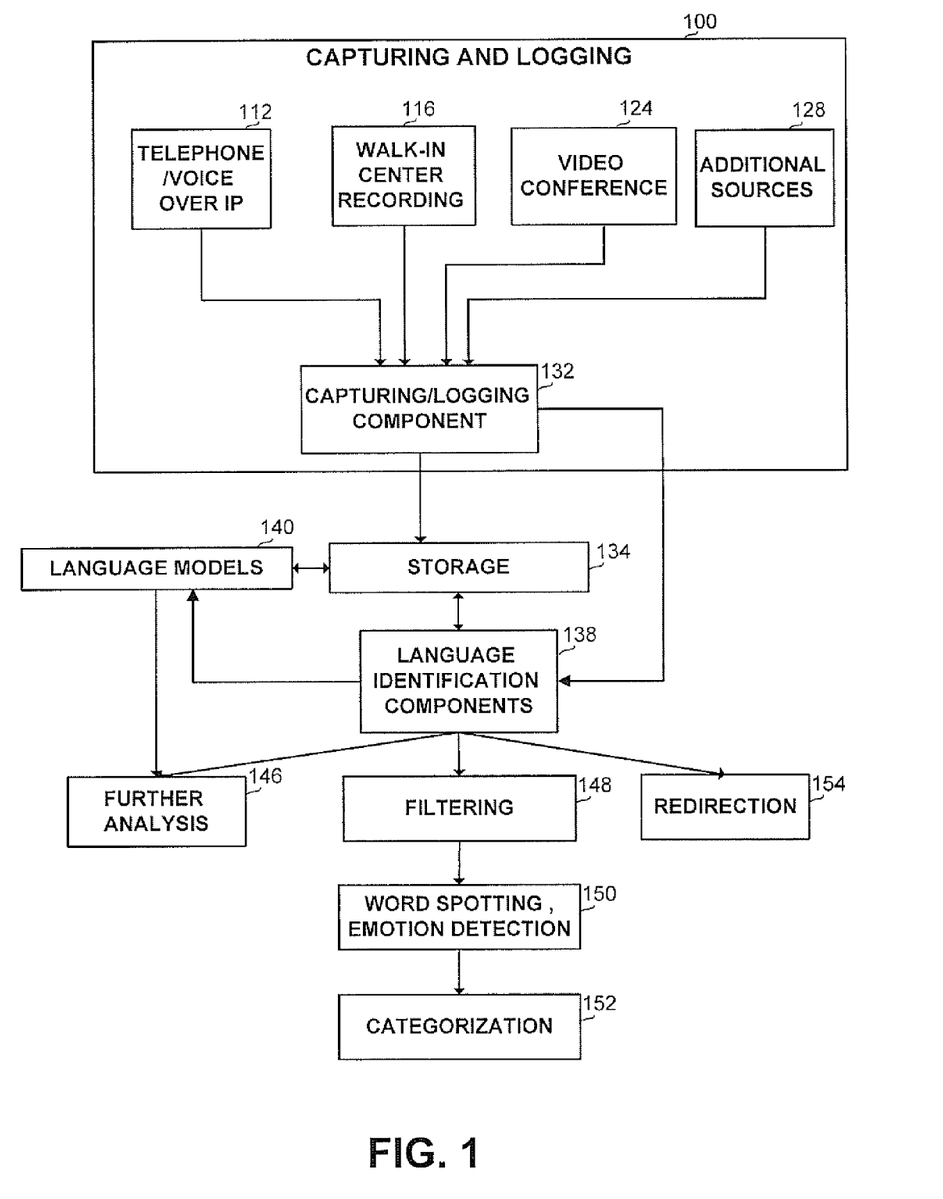
FIG. 1 is a block diagram of the main components in a typical environment in which the disclosed methods and apparatus are used.
Figure 4A:
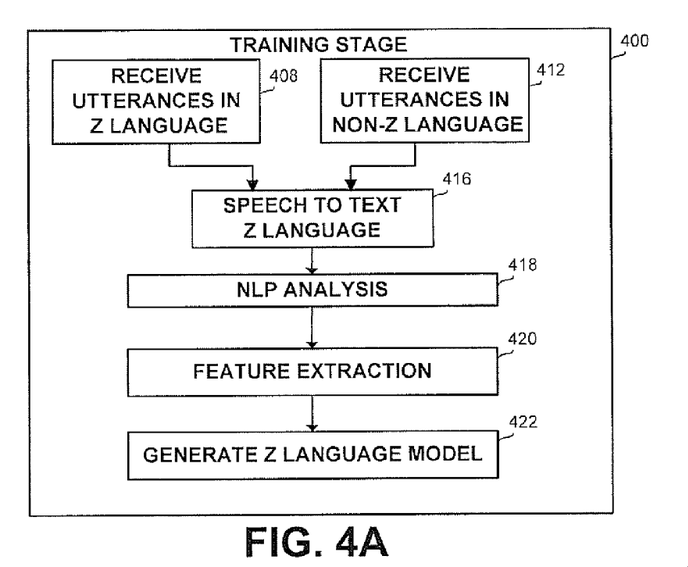
FIG. 4A is a flowchart of the main steps in a method for constructing models for textual language verification for a particular language, in accordance with the disclosure.
Figure 4B:
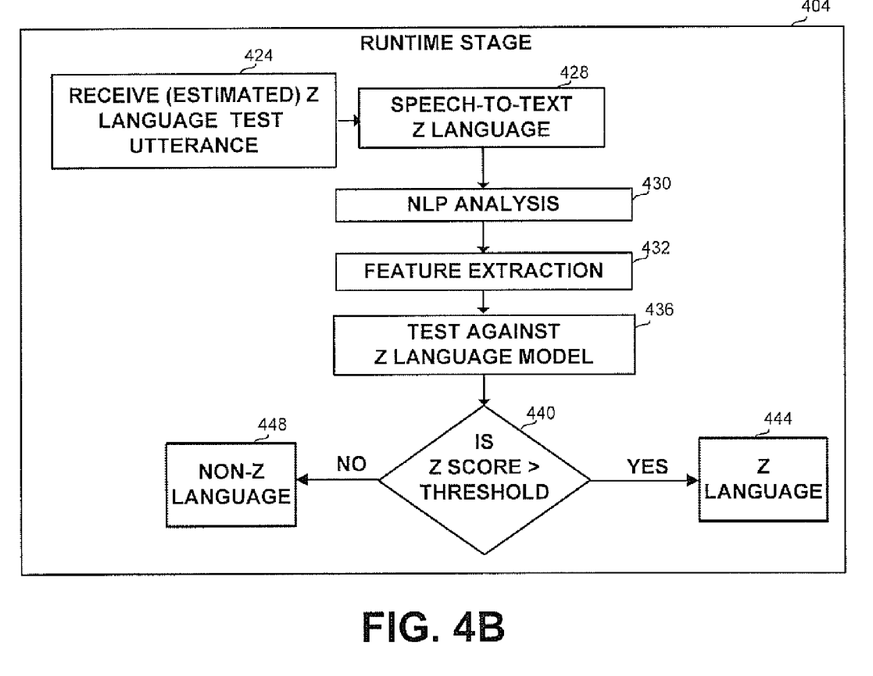
FIG. 4B is a flowchart of the main steps in a method for textual language verification, in accordance with the disclosure.

Referring now to FIG. 1, showing a typical environment in which the disclosed apparatus and methods are used. The environment is preferably an interaction-rich organization, typically a call center, a bank, a trading floor, an insurance company or another financial institute, a public safety contact center, an interception center of a law enforcement organization, a service provider, an internet content delivery company with multimedia search needs or content delivery programs, or the like. Segments, including broadcasts, interactions with customers, users, organization members, suppliers or other parties are captured, thus generating input information of various types. The information types optionally include auditory segments, video segments, textual interactions, and additional data. The capturing of voice interactions, or the vocal part of other interactions, such as video, can employ many forms and technologies, including trunk side, extension side, summed audio, separate audio, various encoding and decoding protocols such as G729, G726, G723.1, and the like. The vocal interactions usually include telephone or voice over IP sessions 112. Telephone of any kind, including landline, mobile, satellite phone or others is currently the main channel for communicating with users, colleagues, suppliers, customers and others in many organizations. The voice typically passes through a PABX (not shown), which in addition to the voice of two or more sides participating in the interaction collects additional information discussed below. A typical environment can further comprise voice over IP channels, which possibly pass through a voice over IP server (not shown). It will be appreciated that voice messages are optionally captured and processed as well, and that the handling is not limited to two- or more sided conversation. The interactions can further include face-to-face interactions, such as those recorded in a walk-in-center 116, video conferences 124, and additional sources of data 128. Additional sources 128 may include vocal sources such as microphone, intercom, vocal input by external systems, broadcasts, files, or any other source. Each vocal interaction may be in one of a multiplicity of languages, so that in order to further analyze or handle the interactions, it is required to identify the language used in the interaction. Additional sources may also include non vocal sources such as e-mails, chat sessions, screen events sessions, facsimiles which may be processed by Object Character Recognition (OCR) systems, or others. Data from all the above-mentioned sources and others is captured and preferably logged by capturing/logging component 132. Capturing/logging component 132 comprises a computing platform executing one or more computer applications as detailed below. The captured data is optionally stored in storage 134 which is preferably a mass storage device, for example an optical storage device such as a CD, a DVD, or a laser disk; a magnetic storage device such as a tape, a hard disk, Storage Area Network (SAN), a Network Attached Storage (NAS), or others; a semiconductor storage device such as Flash device, memory stick, or the like. The storage can be common or separate for different types of captured segments and different types of additional data. The storage can be located onsite where the segments or some of them are captured, or in a remote location. The capturing or the storage components can serve one or more sites of a multi-site organization. Storage 134 can comprise a single storage device or a combination of multiple devices. Language identification components 138 are useful in identifying the language used in an interaction. Language identification components 138 can receive interactions from storage 134, or directly from capturing and logging component 132. Thus, language identification can be performed in real time, for purposes such as indirection of the interaction, or off line for purposes such as further analysis of the interaction. The apparatus uses language and non-language models 140 for each language used within the environment. The generation of models 140 and language identification components 138 are further detailed in association with FIG. 4 below.

The interactions as well as the results of language identification components 138 can be used in a multiplicity of ways and by a multiplicity of components. The components may include further analysis 146, for analyzing the interaction further, using for example text analysis or voice analysis techniques. A particular usage of the interactions after language identification comprises sending the interaction to a filtering component 148, for filtering for example according to parameters optionally acquired from additional systems, such as Computer Telephony Integration (CTI) system, Customer Relationship Management (CRM) systems or others. The interactions and identified language after the filtration are sent to voice analysis components 150, which may apply any voice analysis technique, including word spotting, emption detection or others. Using the language, voice analysis results, optionally text derived from the interaction during language identification or another process, analysis results and optionally additional data can be sent for example to a categorization system 152, which classifies into interaction into one or more predetermined categories, which can be presented to a user, upon which further analysis can be performed, or to which additional usages can be applied.

Another component in which the language identification results can be used is redirection component 154, used for redirecting the interaction to an agent speaking the particular language, or any other system, component or purpose. Redirection component 154 is particularly useful when performing language identification in real-time, but can also be used offline for analyzing recorded messages and calling back the person who called.

The apparatus preferably comprises one or more computing platforms, executing components for carrying out the disclosed steps. The computing platform can be a general purpose computer such as a personal computer, a mainframe computer, or any other type of computing platform that is provisioned with a memory device (not shown), a CPU or microprocessor device, and several I/O ports (not shown). The components are preferably components comprising one or more collections of computer instructions, such as libraries, executables, modules, or the like, programmed in any programming language such as C, C++, Cit, Java or others, and developed under any development environment, such as .Net, J2EE or others. Alternatively, the apparatus and methods can be implemented as firmware ported for a specific processor such as digital signal processor (DSP) or microcontrollers, or can be implemented as hardware or configurable hardware such as field programmable gate array (FPGA) or application specific integrated circuit (ASIC). The software components can be executed on one platform or on multiple platforms wherein data can be transferred from one computing platform to another via a communication channel, such as the Internet, Intranet, Local area network (LAN), wide area network (WAN), or via a device such as CDROM, disk on key, portable disk or others.

Figure 2:
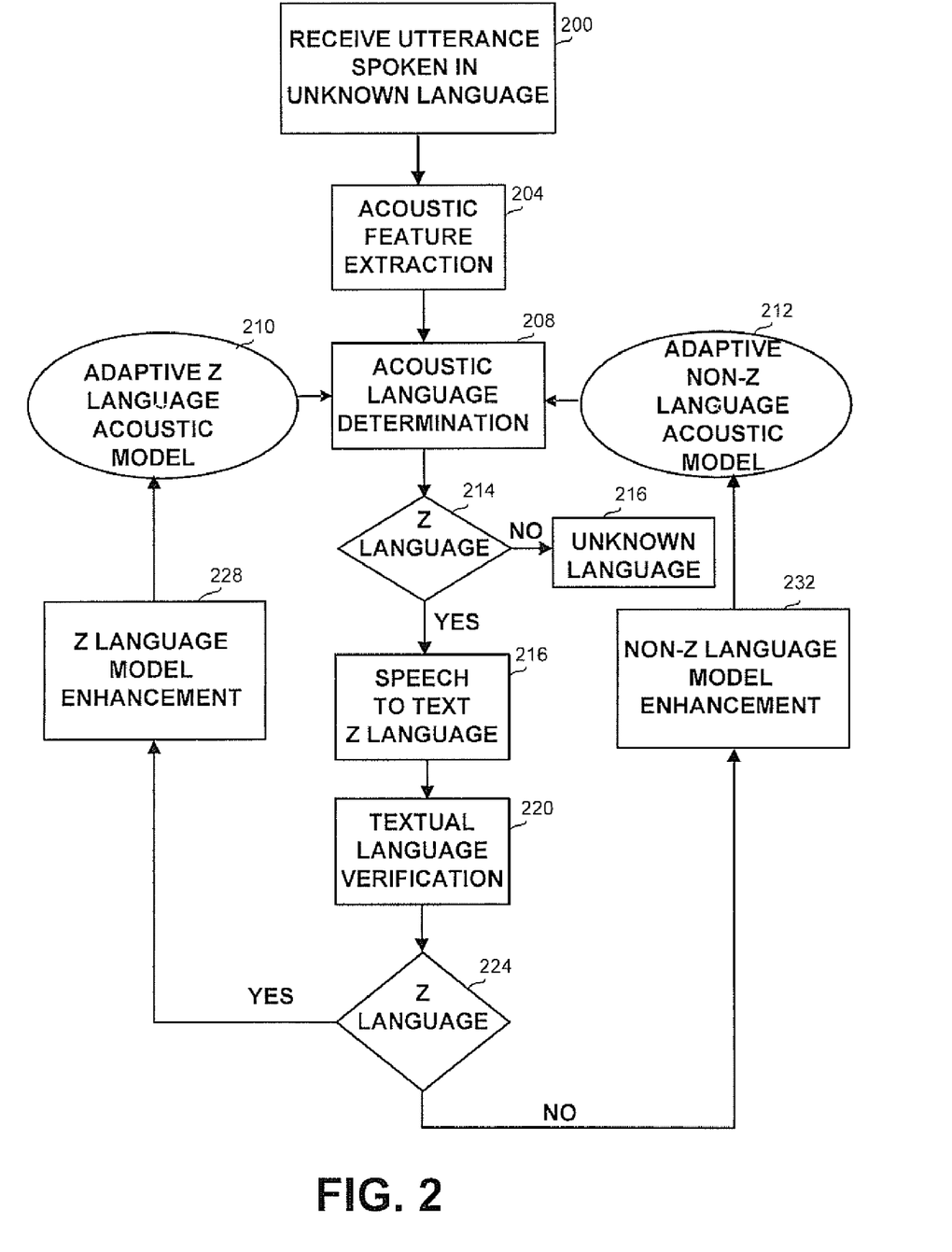
FIG. 2 is a flowchart of the main steps in an embodiment of a method for language identification, in accordance with the disclosure.

Referring now to FIG. 2, showing a flowchart of the main steps in an embodiment of a method for adaptive language identification. The method starts on step 200 by receiving an utterance spoken in an a-priori unknown language. On step 204, acoustic features are extracted from the utterance. The features preferably include features such as energy and its derivatives, pitch and its derivatives, voice quality (e.g. breathy voice), speech rate, or the like. On step 208 acoustic language identification is performed, to yield an estimated language spoken in the audio segment or interaction. The acoustic language identification is performed as further detailed in association with FIG. 3 below. For simplicity, the scenario of FIG. 2 relates to an environment supporting a single language, being Z language. Thus, the utterance is tested acoustically whether the spoken utterance is in Z language. The testing is performed by comparing the features extracted on step 204 to a model 210 of Z language, and comparing the features to a model 212 of non-Z language. Each comparison yields a score indicating what is the probability of the spoken utterance to belong to the respective acoustic model. On step 214 it is determined whether the acoustic identification provides a higher score for the utterance to belong to Z language acoustic model 210 or to non-Z language acoustic model 212. If it is less likely that the utterance is in Z language, then in the particular scenario of FIG. 2, wherein there is only one possible language, being Z language, on step 215 the utterance is determined to be of an unknown language.

If the acoustic determination indicates that the utterance is more likely to be in Z language, then on step 216, speech to text is performed under the assumption that the utterance is indeed in Z language. On step 220, it is verified whether the text output by speech to text step 216 is in Z language. The verification is performed according to a textual model of the language, relating to word frequency, words and words combinations belonging to the particular domain, and similar criteria. The verification result is output.

On optional step 224, if the utterance is indeed in Z language, the features extracted in step 204 are used for enhancing Z language model 210 on optional step 228. However, if the utterance is not in Z language, the features extracted in step 204 are used for enhancing non-Z language model 212 on step 232. It will be appreciated that the features can be used for enhancement of further models. For example, if the utterance is identified to be of Z language, the relevant feature vector can be used for enhancing all other non-language acoustic models.

Existing language verification techniques provide high accuracy. Therefore, if on step 220 it is determined that the utterance is in Z language, the result is of high certainty, and it is relatively safe to enhance Z language model 210, and vice versa for non-Z language model 212.

If the environment supports multiple languages, the acoustic language determination step may be repeated for multiple languages, while speech to text step 216 and textual verification step 220 are generally performed only for the language having the highest acoustic score. Only if textual verification step 220 does not confirm the language determined on the acoustic stage, then speech to text step 216 and textual verification step 220 are repeated for a different language. Alternatively, acoustic language determination step may be performed to indicate two or more languages having the highest scores, or even to score all available languages in descending probability, as detailed in association with FIG. 3 below. Textual language verification is preferably performed only for the language having the highest score, and only if verification fails, repeated for the one or more other languages.

Since steps 216 and 220 are more resource consuming than feature extraction step 204 and acoustic language determination step 208, then the overall method is more efficient and consumes less resources than performing speech to text and textual verification for all languages, but still provides high accuracy.

The language and non-language acoustic models are adapted by cases for which the language identified on the acoustic identification step 208 is confirmed or rejected, respectively, by the textual verification step 220. In an exemplary embodiment, the cases in which a particular language is determined on acoustic language determination step 208 but is not confirmed on textual language verification step 220 are indicated. Therefore, when the frequency of the rejection cases out of all cases drops below a predetermined threshold, it may be assumed that the models represent the environment in a satisfactory way, and speech to text step 216 and textual verification step 220 can be omitted. For the same reason, of the models being representative, when the frequency of these cases drops, enhancing the acoustic models can be stopped.

Figure 3:
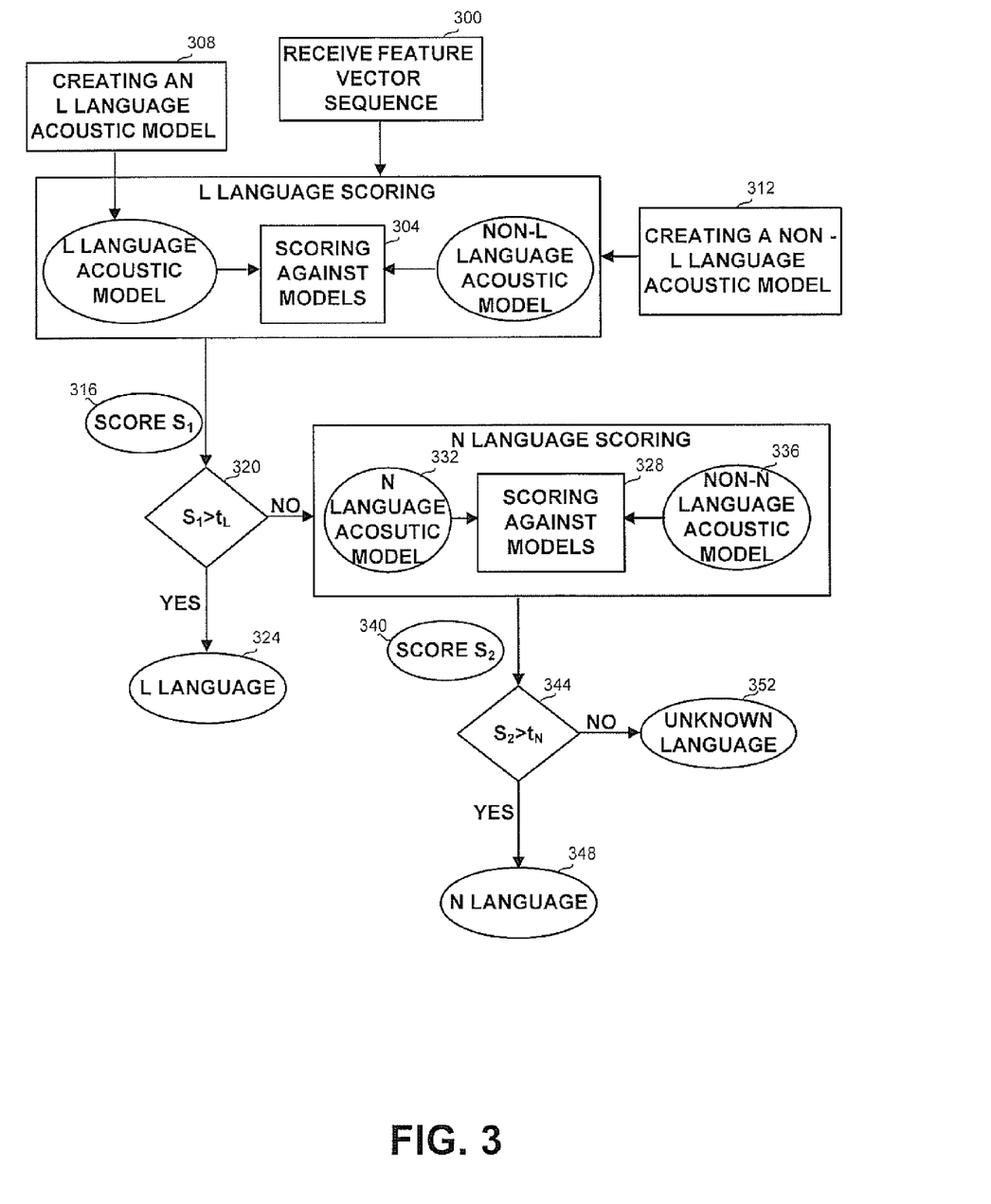
FIG. 3 is a flowchart of the main steps in a method for enhanced acoustic language identification, in accordance with the disclosure.

Referring now to FIG. 3, showing a flowchart of the main steps in a method for enhanced acoustic language identification, generally indicated as step 208 of FIG. 2.

On step 300 a sequence of acoustic feature vectors, as extracted on step 204 of FIG. 2 are received. For a particular L language, on step 304 the acoustic feature vectors are scored against an L language acoustic model generated on step 308 and against a non-L language acoustic model generated on step 312, and a score $S_1$ indicating the probability of the feature vectors to belong to L language is determined. On step 316 it is determined whether score $S_1$ exceeds a predetermined threshold $t_L$ associated with L language. If $S_1$ exceeds threshold $t_L$, it is determined on step 324 that the utterance from which the feature vectors were extracted is in L language, and the utterance is optionally transferred to the textual verification stage, for verifying that the utterances are indeed in L language.

Otherwise, it is examined whether the feature vectors comply with another language. On step 328, the feature vectors are scored against another language, being N language. The feature vectors are scored against N language model 332 and against non-L language model 336, and a score $S_2$ indicating the probability of the feature vectors to belong to N language is determined. On step 316 it is determined whether score $S_2$ exceeds a predetermined threshold associated with N language $t_N$. If $S_2$ exceeds $t_N$, it is determined on step 348 that the utterance from which the feature vectors were extracted is in N language, and the utterance is optionally transferred to the textual verification stage, for verifying that the utterance is indeed in N language.

Otherwise, if further languages are supported in the environment, the utterances are examined in a similar manner against these languages. Otherwise, it is determined on step 352 that the utterance is in an unknown language.

It will be appreciated by a person skilled in the art that the order in which the languages are identified, preferably matches their relative frequency in the environment, in order to perform as little scorings as possible. Thus, if a site receives on the average 80% calls in English, 10% calls in French, 5% in Portuguese and 5% in Spanish, the identification order will be English-French-Portuguese-Spanish or English-French-Spanish-Portuguese.

It will be further appreciated that the language thresholds, such as $t_L$ and $t_N$ may be constant, or may differ for each language.

It will be further appreciated that it is also possible to compare two or more consecutive scores relating to two or more languages. For example, if the difference between $S_1$ and $S_2$ exceeds a predetermined threshold, then the language associated with the higher score can be determined as the language upon which the textual verification is to be performed.

Referring now to FIGS. 4A and 4B, wherein FIG. 4A shows the main steps in constructing language and non-language textual models for a particular Z language, and FIG. 4B shows the main steps in using the language and non-language textual models for textual verification of Z language. Thus, FIG. 4A is preferably performed on a training or preparatory stage, while FIG. 4B is performed in runtime, when it is actually required to identify a language of an utterance.

Referring now to FIG. 4A representing a method of preparing the models for Z language. The method, generally referenced 400, receives on step 408 a collection of utterances known to be in Z language. On step 408 utterances known to be in one or more languages other than Z are received.

On step 416, the utterances, both in Z language and in non-Z languages undergo speech-to-text of Z language. Step 416 thus produces reasonable texts in Z language from the utterances received on step 408, and meaningless texts from the utterances received on step 412.

On optional step 418, the texts generated on step 416 undergo Natural Language Processing (NLP), which includes for instance Parts of Speech (POS) tagging, and stemming, i.e., detecting the base form of each word, typically a singular and present form. NLP step 418 can be performed using proprietary tools, or any other external or commercial tools, such as LinguistxPlatform™ manufactured by Inxight (www.inxight.com). The POS tagging is preferably performed based on the definition as well as on the context of words, and serves for reducing ambiguity of words within the context. The tags may include a verb, a noun (singular), a noun (plural), a pronoun, a preposition, an adverb, an adjective, or others.

On step 420 a linguistic feature vector is constructed for each utterance. Features optionally include, but are not limited to any one or more of the following: words, Part Of Speech tags, stems and their unigrams, bigrams and trigrams, STT certainty.

On step 422, a Z language model is trained based upon the input training data which consists of a set of feature vectors extracted on step 420, wherein each feature vector reflects one utterance. Training is preferably performed using techniques such as Neural networks, Support Vector Machines (SVM) or the like.

Referring now to FIG. 4B, showing the main steps in a method for textually verifying that an utterance indicated by acoustic identification to be of language Z is indeed in Z language.

On step 424, an utterance which is estimated to be in Z language is received. On step 428 the utterances undergo speech to text using a Z language speech to text engine, to produce the text.

On optional step 430 the text undergoes NLP analysis, similarly to training NLP analysis step 418.

On step 432, linguistic features are extracted from the text and from the utterance, similarly to training feature extraction step 420.

On step 436 the Z language model is used to predict the confidence score that the generated text is indeed in Z language. The confidence score represents the probability that the input utterance was uttered in language Z.

On step 440 the Z language score is compared against a predetermined threshold. If the score exceeds the threshold, then on step 444 it is determined that the utterance is indeed uttered in Z language. Otherwise it is determined on step 448 that the utterance is not uttered in Z language.

Figure 5:
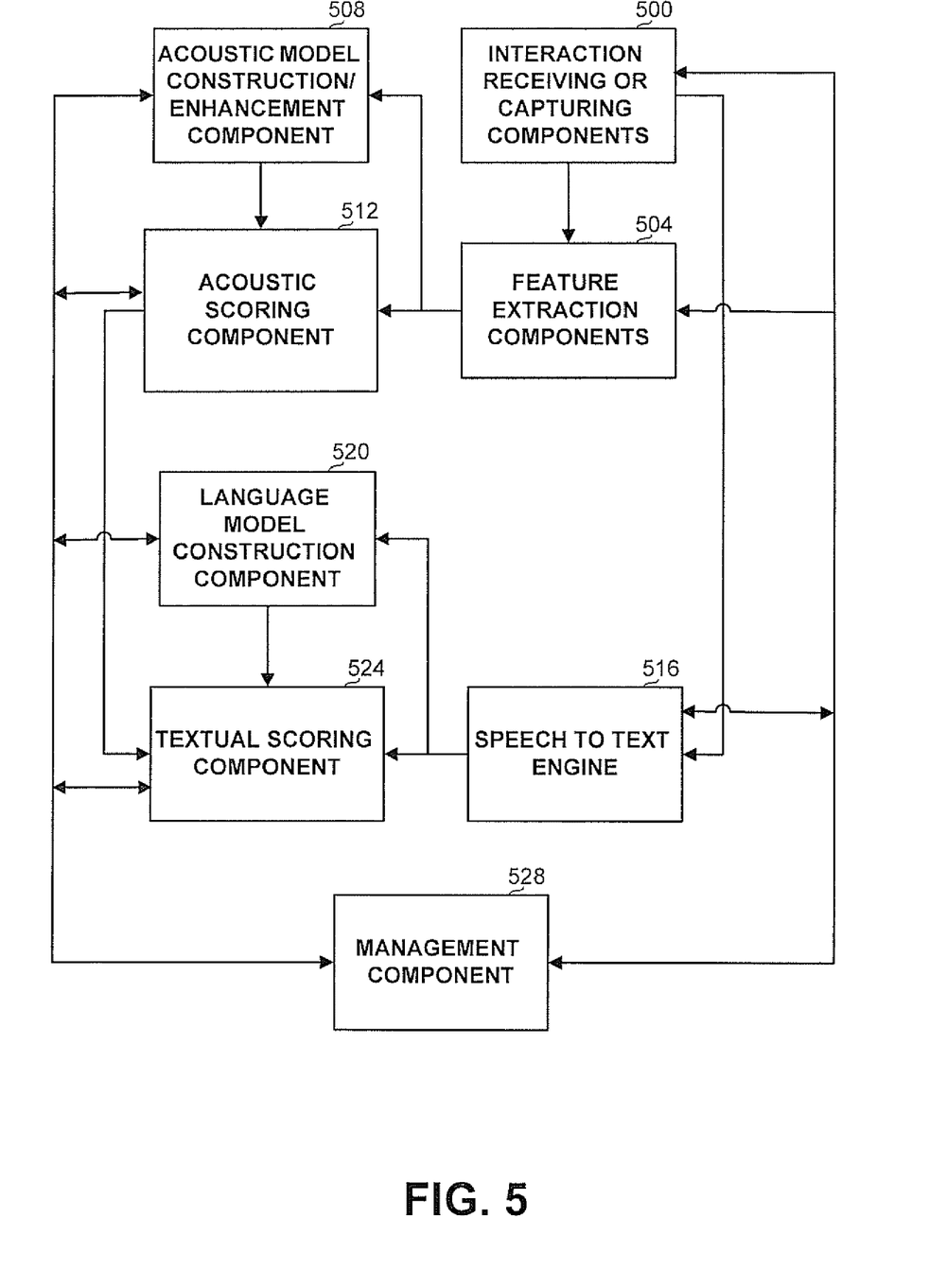
FIG. 5 is a block diagram of the main components in an apparatus for adaptive language identification, in accordance with the disclosure.

Referring now to FIG. 5, showing a block diagram of the main components in an apparatus for identifying a language of a spoken utterance.

The apparatus comprises components 500 for receiving, capturing or logging vocal interactions, as described in association with components 112, 116, 124, 128 and 132 of FIG. 1 above.

The apparatus comprises acoustic-related components, being feature extraction components 504, acoustic model construction component 508, and acoustic scoring component 512.

Feature extraction components 504 is operative in extracting features from audio data such as the interactions captured by components 500. The features include but are not limited to acoustical features. For each language supported in the environment, interactions are captured and features are extracted for interactions in the particular language, and interactions in other languages.

The acoustic features are used by acoustic model construction component 508 for constructing for each language an acoustical model of the language, and optionally an acoustical model of the non-language, i.e. feature vectors extracted from interactions not in the language. The acoustic models are initially constructed based on training corpus, and optionally enhanced in runtime, as information about the language of additional captured interactions is gathered. When enhancing a model, typically when the apparatus is operative in an environment, feature vectors extracted from utterances in the particular language are used to enhance the language model, and feature vectors extracted from utterances in other languages are used to enhance the non-language model. Construction or enhancement of the acoustic models is known in the art and can be found, for example, in Muthusamy Y. K., Barnard E. & Cole R. A. (1994) Reviewing automatic language identification, IEEE Signal Processing Magazine, vol 11, No 4, pp. 33-41; Zissman, M. A. Comparison of Four Approaches to Automatic language Identification of Telephone Speech, IEEE Transactions on Speech and Audio Processing, vol. 4, no. 1, pp. 31-44, January 1996; Lawrence Saul and Fernando Pereira, Aggregate and mixed-order Markov models for statistical language processing, in Proc. of the Second Conference on Empirical Methods in Natural Language Processing, pages 81-89, Somerset, N.J., 1997.

Acoustic scoring component 512 is used for scoring a feature vector against one or more acoustic models associated with a particular language, in order to determine an initial estimation, based on acoustics, whether the utterance is in the particular language or not.

The apparatus further comprises textual verification components, including a speech to text engine 516 for each language supported by the environment, language model construction component 520, and textual scoring component 524 for scoring text against a language model component.

Language model construction component 520 is used for receiving for each language a corpus of texts in the particular language, and a corpus of texts not in the particular language, and constructing a textual model language and a textual non-language model.

Textual scoring component 524 scores text extracted from an utterance by a speech to text engine against a language model, and against a non-language model, both models preferably referring to a language indicated by acoustic scoring component 512, which is also the language upon which the respective speech to text engine was activated.

The apparatus further comprises a management component 528 for controlling or managing the flow of operation and data among the other components, optionally receiving or presenting information from or to a user, or exchanging information with other systems, such as quality management systems designed to assess performance of an agent or another person in a call center, a categorization component, an alert component or the like.

It will be appreciated by a person skilled in the art that the components presented in FIG. 5, excluding receiving or capturing component 500, constitute a preferred implementation of language identification components 138 of FIG. 1.

The disclosed method and apparatus provide for accurate and efficient language identification for multi-lingual environments, such as a call center providing service to customers in multiple languages. The method and apparatus combine the efficiency of acoustic identification, which is optionally further enhanced by prioritizing or otherwise selecting the languages according to their frequency or other factors, with the accuracy of textual language verification. The system attempts to reduce the number of speech to text and textual verification activations.

The system is self learning, meaning that the acoustical and optionally also the textual models, relating to each language and non-language, are enhanced and updated with results, so that future activations are also enhanced and made more optimal.

Since the apparatus and methods enhance the initial models, a user can make a tradeoff between the initial effort and runtime performance. Thus, a user can decide to use more data when initially constructing the acoustic and textual models for each language, and enjoy better runtime from the beginning. Alternatively, a user can decide to use less data initially, and compromise on lesser runtime performance, or in yet another alternative allocate more resources in runtime in order to improve performance.

It will be appreciated that the disclosed methods provide the guidelines of activating textual verification of a particular language indicated by acoustic scoring. The details of prioritizing the acoustics determination, and choosing the language to be textually verified can be operated in multiple variations, which are covered by the current disclosure.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation, material, step of component to the teachings without departing from the essential scope thereof. Therefore, it is intended that the disclosed subject matter not be limited to the particular embodiment disclosed as the best mode contemplated for carrying out this invention but only by the claims that follow.

The invention claimed is:

1. A method for determining a language spoken in an audio segment, from a multiplicity of languages, the method comprising the steps of:
   a. receiving the audio segment;
   b. performing acoustical language identification to yield an at least one estimated languages spoken in the audio segment;
   c. performing speech to text on the audio segment to yield estimated text, using a speech to text engine of a selected language of the at least one estimated languages;
   d. extracting a linguistic feature or statistical data from the estimated text;
   e. verifying whether the estimated text is in the selected language according to the linguistic feature or statistical data;
   f. if the estimated text is in the selected language, outputting the selected language as the language spoken in the audio segment;
   g. if the estimated text is not in the selected language, selecting another language from the at least one estimated languages and repeating steps c, d, e, f and g; and h. if there are no more estimated languages, outputting that the language of the audio segment is not one of the multiplicity of languages.

2. The method of claim 1 further comprising an acoustic model generation or enhancement step for generating or enhancing an at least one acoustic model associated with each of the multiplicity of languages, for performing the acoustical language identification.

3. The method of claim 1 further comprising a textual model generation or enhancement step for generating or enhancing the at least one textual model associated with each of the multiplicity of languages.

4. The method of claim 1 wherein the acoustical language identification comprises the steps of:
   i. extracting an at least one acoustic feature vector from the audio segment;
   j. scoring the at least one acoustic feature vector against an acoustic model constructed upon audio data spoken in a particular language, to yield a first score;
   k. scoring the at least one acoustic feature vector against an acoustic model constructed upon audio data spoken in languages other than the particular language, to yield a second score; and
   l. if the first score exceeds the second score, or if the first score exceeds the second score by at least a predetermined threshold or percentage, indicating the particular language as the selected language.

5. The method of claim 4 further comprising repeating steps j, k, and l for a second particular language.

6. The method of claim 1 wherein verifying whether the estimated text is in the selected language comprises the steps of:
   m. scoring the estimated text against a textual model constructed upon text in the selected language, to yield a first score; and
   n. if the first score exceeds a predetermined threshold, indicating that the audio segment is in the selected language.

7. The method of claim 6 further comprising repeating steps m, and n for a second selected language.

8. The method of claim 1 wherein the acoustical language identification comprises the steps of:
   extracting an at least one acoustic feature vector from the audio segment;
   scoring the at least one acoustic feature vector against a first acoustic model constructed upon audio data spoken in a particular language, to yield a first score;
   scoring the at least one acoustic feature vector against a second acoustic model constructed upon audio data spoken in languages other than the particular language, to yield a second score; and
   if the first score exceeds the second score, or if the first score exceeds the second score by at least a predetermined threshold or percentage, indicating the particular language as the selected language;
   and wherein verifying whether the estimated text is in the selected language comprises the steps of:
   scoring the estimated text against a textual model constructed upon text in a particular language, to yield a first score;
   scoring the estimated text against a textual model constructed upon text not in the particular language, to yield a second score; and
   if the first score exceeds the second score, or if the first score exceeds the second score by at least a predetermined threshold or percentage, indicating that the audio segment is in the particular language; and further comprising the steps of:
   enhancing the first acoustic model with the feature vector if the audio segment is in the particular language; and
   enhancing the second acoustic model with the feature vector if the audio segment is not in the particular language.

9. The method of claim 8 further comprising the steps of:
   tracking cases in which the estimated text is not in the selected language; and
   if the frequency of the cases drops below a predetermined threshold, omitting steps c, d, e, f, g, and h for a further audio segment and outputting whether the language of the further audio segment is in the selected language according to the acoustical language identification.

10. The method of claim 1 further comprising a step of directing a call or an interaction to a particular person or system based on the language spoken in the call or interaction.

11. An apparatus for determining a language spoken in an audio segment, from a multiplicity of languages, the apparatus comprising:
    a feature extraction component for extracting at least one feature vector from the audio segment;
    an acoustic scoring component for scoring the feature vector against at least one acoustic model associated with an at least one language selected from the multiplicity of languages;
    a speech to text engine for each of the multiplicity of languages; and
    a textual scoring component for verifying using a textual model associated with the at least one selected language, whether the text produced by the speech to text engine is indeed in the selected language.

12. The apparatus of claim 11 further comprising an acoustic model construction or enhancement component for generating or enhancing an at least one acoustic model associated with each of the multiplicity of languages.

13. The apparatus of claim 11 further comprising a textual model construction or enhancement component for generating or enhancing the at least one textual model associated with a particular language selected from the multiplicity of languages.

14. The apparatus of claim 12 wherein the at least one acoustic model associated with each of the multiplicity of languages comprises an acoustic language model and an acoustic non-language model for each of the multiplicity of languages.

15. The apparatus of claim 13 wherein the at least one textual model comprises a textual language model and a textual non-language model for the particular language.

16. An apparatus for determining a language spoken in an audio segment capturing an at least one interaction, from a multiplicity of languages, the apparatus comprising:
    an interaction receiving or capturing component for receiving or capturing the audio segment;
    a storage component for storing the audio segment, an at least one acoustic language model and an at least one textual language model;
    an acoustic feature extraction component for extracting at least one acoustic feature vector from the audio segment;
    an acoustic scoring component for scoring the feature vector against at least one acoustic model associated with a selected language;
    a speech to text engine for each of the multiplicity of languages;

a textual feature extraction component for extracting at least one textual feature vector from text generated by the speech to text engine; and a textual scoring component for verifying using a textual model associated with the selected language, whether the text produced by the speech to text engine is indeed in the selected language.

17. The apparatus of claim 16 further comprising a natural language processing component for processing text.

18. The apparatus of claim 16 further comprising a redirection component for directing the at least one interaction to a particular person or system, or for calling back a person who made the at least one interaction.

19. The apparatus of claim 16 further comprising:
a filtering component for filtering the at least one interaction according to an at least one parameter;
a voice analysis component for analyzing the at least one interaction; and
a categorization component for categorizing the at least one interaction into an at least one category.

* * * * *